(12) United States Patent
Lindemann et al.

(10) Patent No.: US 8,473,375 B2
(45) Date of Patent: Jun. 25, 2013

(54) UTILIZING SUPPORTING DIMENSIONS TO FURTHER DEFINE TRANSACTION ENTITIES IN A COMPUTERIZED FINANCIAL/ACCOUNTING SYSTEM

(75) Inventors: Brett M. Lindemann, Fargo, ND (US); Kimberly A. Nelson, Fargo, ND (US); Ronald H. Schulz, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 2159 days.

(21) Appl. No.: 11/063,199

(22) Filed: Feb. 22, 2005

(65) Prior Publication Data
US 2006/0190397 A1    Aug. 24, 2006

(51) Int. Cl.
*G07B 17/00* (2006.01)
*G07F 19/00* (2006.01)
*G06Q 40/00* (2012.01)

(52) U.S. Cl.
USPC ............................................. 705/30; 705/35

(58) Field of Classification Search
USPC .................................................... 705/30
See application file for complete search history.

(56) References Cited

U.S. PATENT DOCUMENTS

| | | | | |
|---|---|---|---|---|
| 5,740,427 A * | 4/1998 | Stoller | ................................. | 1/1 |
| 2003/0033225 A1* | 2/2003 | Meldahl | ......................... | 705/30 |
| 2003/0158798 A1* | 8/2003 | Green | ........................... | 705/30 |
| 2004/0088232 A1* | 5/2004 | Minnis, Jr. | ..................... | 705/30 |
| 2005/0055289 A1* | 3/2005 | Mehldahl | ........................ | 705/30 |
| 2006/0167771 A1* | 7/2006 | Meldahl | ......................... | 705/30 |
| 2007/0061260 A1* | 3/2007 | deGroeve et al. | .............. | 705/44 |

OTHER PUBLICATIONS

Cassone, D. T. A process to estimate the value of a company based on operational performance metrics. (2005) Kansas State University. ProQuest Dissertations and Theses,, 201-201 p. Retrieved from ProQuest.*

* cited by examiner

*Primary Examiner* — Scott Zare
(74) *Attorney, Agent, or Firm* — Westman, Champlin & Kelly, P.A.

(57) ABSTRACT

A computer-implemented financial system that allows for account modules to be set up, and transaction data to be entered, stored and retrieved as transaction entities, with each transaction entity including an amount, is provided. The financial system further allows for supporting dimensions (dimensions that are entered and saved to the transaction only and that are not selected from a predefined dimension code list) to be utilized.

20 Claims, 5 Drawing Sheets

UTILIZING SUPPORTING DIMENSIONS TO FURTHER DEFINE TRANSACTION ENTITIES IN A COMPUTERIZED FINANCIAL/ACCOUNTING SYSTEM

BACKGROUND OF THE INVENTION

The present invention generally relates to computerized financial/accounting systems. More particularly, the present invention relates to utilizing supporting dimensions to further define transaction entities in a financial/accounting system.

Computerized financial systems and programs (i.e., software applications) are configured for use by both accountants and non-accountants. These systems allow users to set up various types of accounts such as general ledger, inventory, order entry, accounts receivable, accounts payable, bank manager, and payroll accounts. Each account, or account module, of the accounting system are typically fully integrated and share common data. As a result, a transaction can be entered, for example, as an invoice, and the accounting system automatically performs the necessary credits and debits on the affected accounts including posting the transaction to the general ledger without requiring the user to reenter any data. Thus, such computerized accounting systems are ideal tools for the non-accountant user. Additionally, they save time, reduce the likelihood of errors, and eliminate the need to reenter data for posting to the general ledger.

The general ledger maintains a list of posted transactions relating to all of the accounts of the system. As is well known for double entry bookkeeping systems, valid accounting transactions include a debit component and a credit component where the absolute value of the debit component is equal to the absolute value of the credit component. The general ledger module typically maintains the summary information of the transaction histories and balances for all of the accounts of the system, while the individual account modules maintain more detailed historical transaction data and balances for their respective accounts. In the general ledger module and the other account modules, individual entries or records relating to a transaction are, in general, referred to as transaction entities.

In a typical accounting system, in addition to an account number, date and an amount, a transaction entity usually includes information that further defines the entity. For example, a transaction entity for ticket sales at an event can include an event code and a visitor code (to further define the transaction entity) in addition to an event date, an account number, and an amount, which constitute the "core" of the transaction information. Valid event codes and visitor codes are predefined and stored in the financial system. Thus, a user entering ticket sales transactions is restricted to entering/selecting and saving only predefined event and visitor codes to further define the sales transactions. Such additional pieces of information or dimensions, that are predefined and selected on the transaction, are referred to as "standard" dimensions. Using only standard dimensions to further define transactions helps maintain data integrity within the financial system. However, such constraints do not allow a user to enter/track additional non-predefinable data, related to the transaction, such as a quantity (for example, in a ticket sales transaction, the number of people who attended a particular event), which may be useful for analytical purposes.

SUMMARY OF THE INVENTION

The present invention relates to a computer-implemented financial system that allows for account modules to be set up, and transaction data to be entered, stored and retrieved as transaction entities, with each transaction entity including an amount. The financial system further allows for supporting dimensions (dimensions that are entered and saved to the transaction only and that are not selected from a predefined dimension code list) to be utilized.

BRIEF DESCRIPTION OF THE DRAWINGS

FIG. 1 is a block diagram of one illustrative computing environment in which the present invention can be implemented.

FIG. 2 is a block diagram of a financial management system utilizing supporting dimensions in accordance with an embodiment of the present invention.

FIG. 4 is a simplified block diagram of an example supporting dimension definition/creation screen, which is a part of a financial system of the present invention.

FIG. 5 is a simplified block diagram of an example transaction viewing and reporting screen, which is a part of a financial system of the present invention.

DETAILED DESCRIPTION OF ILLUSTRATIVE EMBODIMENTS

The present invention relates, in general, to financial systems that utilize dimensions to further define transaction entities. More specifically, the present invention relates to financial systems in which supporting dimensions (dimensions that are entered and saved to the transaction only and that are not selected from a predefined dimension code list) can be added to transactions to help categorize and track highly specific transaction activity with relative ease. However, before describing the present invention in greater detail, one illustrative embodiment in which the present invention can be used will be discussed.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

FIG. 2 is a simplified block diagram of a financial management system 200 in which supporting dimensions can be utilized to further define transaction entities in accordance with an illustrative embodiment of the present invention. System 200 includes a front-end tool 202, a financial system database 204 and a financial system interface 206 between front-end tool 202 and financial system database 204. Front-end tool 202 includes a number of components for designing account modules, screens and reports, and for utilizing the screens for data entry and viewing information. For simplification, only standard dimension component 208 and supporting dimension component 210, which are utilized to define standard and supporting dimensions, respectively, are shown. Examples of standard and supporting dimensions, and details regarding how supporting dimensions are defined, are included further below.

Front-end tool 202 communicates with database 204 via interface 206. Interface 206, in general, is capable of translating generalized requests, update statements, etc., into database specific query/update statements, which typically include sequential query language (SQL) statements, that retrieve/update the necessary data stored in database 204. Interface 206 returns any data retrieved from database 204 to front-end tool 202.

Prior to discussing the present invention in greater detail, a brief discussion (with examples) of the differences between standard and supporting dimensions may be helpful. As mentioned earlier, standard dimensions have dimension codes, and are generally based on information about an enterprise such as departments and product lines. Supporting dimensions do not have dimension codes and are used to further describe an entity of a transaction. Supporting dimension information is not generally used in financial reports but is important for internal analysis. Tracking the attendance at events or entering the stock price for purchased stock are some examples of supporting dimensions.

As will be discussed in greater detail further below, in some embodiments of the present invention, valid combination rules or usage rules are used to determine when a supporting dimension is available for entry. The rules can also determine if the supporting dimension is required, optional or not allowed. It should be noted that the usage rules are optional and can be defined independently of accounts and account modules. Thus, supporting dimensions can be defined with or without usage rules and are typically defined and utilized independently of accounts and account modules. The following is a specific example that illustrates how supporting dimensions can be used in line items of an invoice prepared by a company that contracts out security and parking for events. Parking and security are billed per employee (quantity). For an event, the company wants to know how many vehicles were parked and what the attendance was for the event to help with future staffing needs for security and parking.

Assume the following:
Supporting Dimensions (No Codes):
ATTD (Attendance)
VEH (Vehicles)
Standard Dimension:
EVENT
   Valid Event Codes
   CONC (Concerts)
   MONTRUCK (Monster Truck Shows)
   H&G (Home and Garden Shows)
   BB (Basketball Games)
   FB (Football Games)

A first usage rule, requiring entry of a value for the Attendance (ATTD) supporting dimension if "Security" is entered as an invoice item, is defined. A second usage rule, requiring entry of a value for the Vehicle (VEH) supporting dimension if "Parking" is entered as an invoice item, is also defined. A value (restricted to the any one of the above predefined event codes) for the EVENT standard dimension is required when either "Parking" or "Security" is entered as an item. Example invoice items/transactions entered using the above combination or usage rules are shown below in Table 1.

TABLE 1

| Item | Quantity | Amount | EVENT | VEH | ATTD |
|---|---|---|---|---|---|
| Parking | 4 | 500.00 | MONTRUCK | 3250 | |
| Security | 10 | 2000.00 | MONTRUCK | | 4350 |

As can be seen from the above example, any quantity can be entered as a value for the ATTD and the VEH supporting dimensions. However, as mentioned above, usage rules that allow or require entry of values for VEH only when "Parking" is entered as an item, and that allow or require entry of values for ATTD only when "Security" is entered as an item, are defined. Values for the EVENT standard dimension are restricted to the respective predefined codes.

Figure 3:
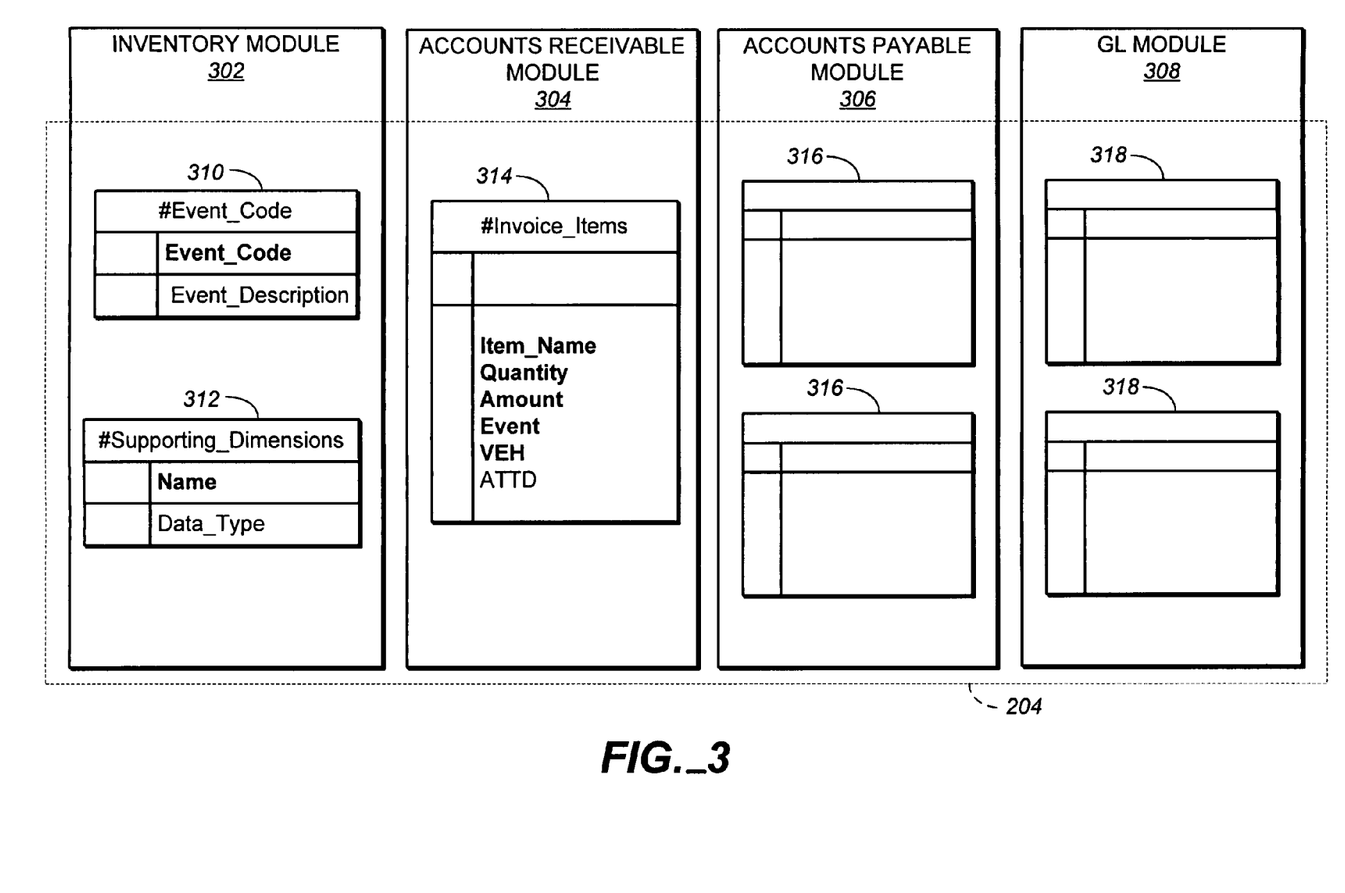
FIG. 3 is a simplified block diagram illustrating how supporting dimensions are stored.

Transaction entities (invoice line items, for example), such as those shown in Table 1 above, are stored in a financial system database (such as 204), which typically includes multiple tables for each account module. FIG. 3 is a simplified block diagram illustrating account modules with different tables. Standard and supporting dimension information, shown in the above example, can be stored in tables (included in database 204) that form a part of an inventory module 302 shown in FIG. 3. The different event codes and the corresponding event descriptions are stored in an event code (Event_Code) table 310. It should be noted that, in some embodiments, all standard dimensions (including event codes and other codes for different standard dimensions defined in the financial system) can be stored in a single table. The supporting dimensions are stored in Supporting_Dimensions table 312. The transactions shown in Table 1 above are stored in Invoice_Items table 314, which is a part of accounts receivable module 304. As mentioned above, tables (316, 318) for other account modules such as accounts payable module 306 and general ledger (GL) module 308 are also stored in database 204. Also, as noted earlier, the account modules (such as 302, 304, 306 and 308) are fully integrated and share common data.

FIG. 4 illustrates an example supporting dimension definition/creation screen 400, which is a part of financial system 200 of the present invention. With the help of screen or user interface 400, a user can enter a supporting dimension name (in required field 402), select a supporting dimension data type (using required field 404) and select a module or table to which the supporting dimension is being added (using field 406). An optional usage rule (to limit supporting dimension values to a certain range, for example) for the supporting dimension can be entered in field 408. The defined supporting dimension can be inserted into the financial system database 204 by pointing and clicking, on an accept button 410, using a mouse. Screen 400 also includes a message field 412, which is used to display errors associated with attempts to accept insufficient or invalid supporting dimension information, for example.

FIG. 5 illustrates an example transaction viewing and reporting screen 500, which is a part of financial system 200 of the present invention. With the help of screen or user interface 500, a user can enter query criteria for account modules (in field 502), and point and click on execute query button 504, using a mouse, to retrieve the information requested in the query. The query can include a request for supporting dimension information. The retrieved information can be displayed in detail section 506 of the screen and/or written to a file. Reports (based on an entered query) can also be printed or viewed by pointing and clicking on a print report button 508 or a view report button 510. A message field 512 to display errors and other messages is also included.

Utilizing a screen such as 500, for the invoice item example provided earlier, enables a user to generate reports to show per event the number of vehicles and the attendance. Thus, using the present invention, analysis can be carried out to help with future staffing needs for security and parking, for example.

It should be noted that a supporting dimension can include a wide variety of things. A few examples include a quantity, string, date or even another currency value. Once a particular supporting dimension is defined, different software applications, internal or external to the financial system, can be granted access to query and/or update the supporting dimension.

Although the present invention has been described with reference to particular embodiments, workers skilled in the art will recognize that changes may be made in form and detail without departing from the spirit and scope of the invention. It should be noted that supporting dimensions are not necessarily restricted to being associated with only transaction data. Supporting dimensions can be associated, in general, with any business data or records such as master records, transaction data, etc., without departing from the scope and spirit of the present invention.

What is claimed is:

1. A computer implemented method comprising:
   setting up, using a processor, account modules for transaction data to be entered, each transaction entry including two or more standard dimensions, the standard dimensions comprising at least an account number and an amount, each of the one or more standard dimension having a value that is restricted to a set of predefined dimension codes;
   defining, using the processor, supporting dimensions for storing information that provides additional non-financial information related to the transaction entry;
   wherein the defining of supporting dimensions comprises:
      displaying, using a display device, a first user interface having user-editable fields that enable a user to enter information for defining a supporting dimension, the user-editable fields including a first user-editable field for receiving an indication of a name for the supporting dimension, and a second user-editable field for receiving an indication of an accounting module, and a third user-editable field for receiving an indication of a data type of the supporting dimension,
      receiving through the first user interface the information for defining the supporting dimension, the information including the indication of the name for the supporting dimension, the indication of the accounting module, and the indication of the data type of the supporting dimension;
      generating, using the processor, the supporting dimension by associating the supporting dimension with the accounting module, the data type, and the name;
      wherein the received information for defining the name of the supporting dimension is not selected from a predefined dimension code list;
   receiving, through a second user interface, query criteria for the accounting module; and
   displaying a report on the second user interface that includes a list of transactions associated with the accounting module that match the query criteria, at least a portion of the transactions in the list of transaction including a value for the supporting dimension.

2. The method of claim 1, wherein the information for defining the supporting dimension further includes a data type associated with the supporting dimension, the data type being selected as either a numeric data type or a text data type, and wherein the values for the supporting dimension displayed in the report on the second user interface are consistent with the selected data type.

3. The method of claim 2, wherein the information for defining the supporting dimension further includes an indication of a usage rule associated with the supporting dimension, wherein the list of transactions displayed in the report on the second user interface is consistent with the indication of the usage rule, wherein the first user-editable field for receiving the indication of the name for the supporting dimension includes a text box that enables the user to type in the name, and wherein the second user-editable field for receiving the indication of the accounting module includes a pre-populated list that enables the user to select the accounting module from one of several accounting modules identified in the pre-populated list.

4. The method of claim 1, and further comprising: displaying an error message in an error message field of the first user interface upon receipt of invalid supporting dimension information.

5. The method of claim 4, and further comprising: displaying an error message in an error message field of the second user interface upon receipt of invalid query criteria.

6. The method of claim 1, wherein each transaction in the list of transactions includes indications of an item, a quantity, and an amount.

7. The method of claim 1, wherein each transaction in the list of transactions includes a value for one or more additional supporting dimensions.

8. The method of claim 1, and further comprising:
   granting access to an external application to query and update the supporting dimension.

9. The method of claim 1, wherein the list of transactions is ranked based in part on the supporting dimension values.

10. The method of claim 1, wherein each of the values of the supporting dimension is associated with a quantity, a string, a date, or a currency.

11. A computer implemented method comprising:
    utilizing a first user interface to define supporting dimensions, the first user interface including user input fields for providing a name and a usage rule for each of the supporting dimensions;
    receiving, using a computer processor, a plurality of transaction entities, each transaction entity including one or more standard dimensions and one or more of the supporting dimensions, each of the one or more standard dimensions having a value that is restricted to a set of predefined dimension codes, and each of the one or more of the supporting dimensions having a value that is unrestricted to the set of predefined dimension codes and that is consistent with its usage rule;

associating, using the computer processor, the plurality of transaction entities with an account module;

displaying a second user interface that enables a user to submit queries and view reports, the second user interface including a user-editable field that enables the user to enter query criteria, the second user interface also including a report section that is configured to display reports generated in response to the query criteria;

querying the account module utilizing the query criteria received through the second user interface; and utilizing the computer processor to generate and display a report that includes a portion of the plurality of transaction entities that satisfies the query criteria, the report being displayed in the report section of the second user interface and including the one or more standard dimension values and the one or more of the supporting dimension values for the portion of the plurality of transaction entities.

12. The method of claim 11, wherein the report includes labels identifying the one or more standard dimensions and the one or more of the supporting dimensions, and wherein the second user interface has control buttons that enable the user to execute queries, print reports, and view reports.

13. The method of claim 11, and further comprising: displaying a first error message on the first user interface upon receipt of invalid supporting dimension information; and displaying a second error message on the second user interface upon receipt of invalid query criteria.

14. The method of claim 11, wherein the report is in a table format having a series of rows and a series of columns, and wherein each transaction entity in the portion of the plurality of transaction entities is displayed in one row of the series of rows.

15. The method of claim 11, wherein the first user interface further includes a user input field for providing a data type for each of the supporting dimensions.

16. The method of claim 15, wherein the first user interface further includes a user input field for providing an accounting module associated with each of the supporting dimensions.

17. The method of claim 16, wherein the user input field for the data type and the user input field for the accounting module include pre-populated lists that are displayed in the first user interface.

18. The method of claim 17, wherein the user input field for the name includes a text box that enables a user to type in a name for each of the supporting dimensions.

19. The method of claim 11, wherein the one or more of the supporting dimension values include a quantity, a string, a date, and a currency value.

20. A computer system comprising:

a first user interface that simultaneously displays multiple user-editable input fields for receiving user inputs for defining a supporting dimension, the user input fields including a first user input field that receives information identifying a name of the supporting dimension, a second user input field that receives information identifying a data type of the supporting dimension, a third user input field that receives information identifying an accounting module associated with the supporting dimension, and a fourth user input field that receives information identifying a usage rule for the supporting dimension, wherein the received information for defining the name of the supporting dimension is not selected from a predefined dimension code list, the supporting dimensions for storing information that provides additional non-financial information related to a transaction entity;

a computer processor that is a component of a computer that utilizes the user inputs to generate the supporting dimension;

a financial system database that stores transaction entities, each transaction entity including standard dimensions, each of the one or more standard dimension having a value that is restricted to a set of predefined dimension codes, the standard dimensions comprising an account number, a date, and an amount, and at least some of the transaction entities having a value for the supporting dimension;

a second user interface that simultaneously displays a query criteria field and a report section, the query criteria field being configured to receive user input indicative of a query, and the report section being configured to display a report generated in response to the query; and a report generator that identifies a portion of the transaction entities that is relevant to the query and, based on the identified relevancy, includes the supporting dimension values for the portion of the transaction entities in the report displayed in the report section of the second user interface.

* * * * *